United States Patent [19]

Hoda

[11] 4,017,289
[45] Apr. 12, 1977

[54] OPAL GLASSES PREPARED THROUGH CLAY VITRIFICATION

[75] Inventor: Syed N. Hoda, Horseheads, N.Y.

[73] Assignee: Corning Glass Works, Corning, N.Y.

[22] Filed: Aug. 9, 1976

[21] Appl. No.: 712,480

Related U.S. Application Data

[63] Continuation-in-part of Ser. No. 679,983, April 26, 1976, abandoned.

[52] U.S. Cl. .................................. 65/18; 65/27; 65/30 E; 65/33; 106/DIG. 8; 106/67; 106/72; 106/73; 264/22; 264/66

[51] Int. Cl.² .............. C03B 23/20; C04B 33/13; C04B 7/00

[58] Field of Search ............... 106/67, 73, DIG. 8, 106/72; 264/22, 66; 65/30 E, 18, 27, 33

[56] References Cited

UNITED STATES PATENTS

| | | | |
|---|---|---|---|
| 2,000,338 | 5/1935 | Kiefoth | 106/73 X |
| 2,266,646 | 12/1941 | Lower | 106/73 X |
| 2,880,099 | 3/1959 | Audrieth | 106/73 |
| 2,973,278 | 2/1961 | Kadisch | 106/DIG. 8 |
| 3,012,050 | 12/1961 | Fox, Jr. et al. | 106/72 X |
| 3,553,063 | 1/1971 | Megles | 65/30 E |
| 3,674,521 | 7/1972 | Noble et al. | 106/73 X |
| 3,753,743 | 8/1973 | Kukuda et al. | 65/27 X |
| 3,764,283 | 10/1973 | Hagedorn | 65/33 |
| 3,779,982 | 12/1973 | Erickson et al. | 106/73 X |
| 3,834,981 | 9/1974 | Grossman et al. | 65/30 E X |
| 3,844,812 | 10/1974 | Fishwick | 106/72 X |
| 3,850,602 | 11/1974 | Bruning | 65/18 |
| 3,963,506 | 6/1976 | Shutt et al. | 106/67 |
| 3,967,943 | 7/1976 | Seeley | 65/27 |

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

The instant invention is directed to the production of opal glasses through the solid state vitrification of certain bentonite-type clays. The process involves five general steps: (1) the clay is ion exchanged at low temperatures in aqueous solutions; (2) the ion exchanged clay is thoroughly washed with water; (3) the ion exchanged clay is preferably heated at moderate temperatures to expedite removal of the water; (4) the dehydrated clay is shaped into a body of a desired configuration; and (5) the shaped body is fired to vitrification utilizing a defined sintering schedule. The resulting body is a white or off-white opal glass containing minor amounts of crystal phases. Uniformly colored glasses can be prepared employing such conventional glass coloring agents as chromium, cobalt, copper, nickel, vanadium, etc. The process possesses the practical advantages of inexpensive batch materials, the elimination of the need for glass melting facilities, and low energy consumption in forming glass articles.

9 Claims, 1 Drawing Figure

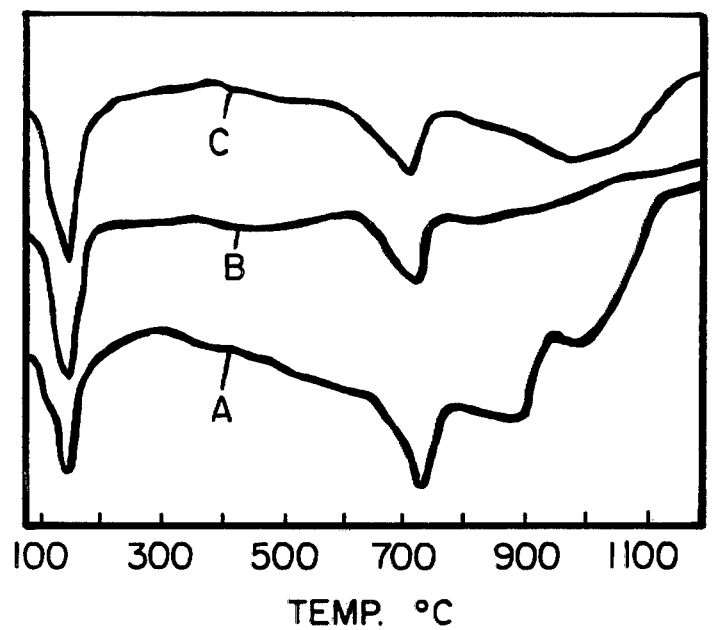

OPAL GLASSES PREPARED THROUGH CLAY VITRIFICATION

This application is a continuation-in-part of my co-pending application Ser. No. 679,983, filed Apr. 26, 1976 now abandoned.

BACKGROUND OF THE INVENTION

Clays are commercially available and comprise one of the least expensive groups of raw materials. When heated, certain varieties are known to partially vitrify before melting. However, the degree of vitrification is customarily quite small and is dependent upon composition, the crystallinity of the clay, impurities present therein, and particle size. For example, it is known that certain iron-rich montmorillonites partially vitrify at 1050° C. Complete vitrification thereof will take place at 12° C. but is always accompanied with large scale melting, forming, bloat holes, and essentially total deformation. In contrast, other montmorillonites are known wherein high temperature crystalline phases develop at temperatures above 900° C. which may persist up to temperatures in excess of 1300° C. Yet, it will be recognized that low temperature vitrification of clay to a homogeneous glass, i.e., the elimination of melting batches required in the conventional practice of glass manufacture, can result in numerous savings.

Clays are built up of sheet structures involving two units. The first unit consists of Si-O tetrahedra linked together by sharing oxygens so that the bases are coplanar and the apices point in the same direction. The other unit consists of an octahedral sheet in which $Mg^{+2}$, $Fe^{+2}$, $Al^{+3}$, etc., are located in 6-fold coordination. The two units are joined together by sharing oxygens. Unshared oxygen sites are taken by hydroxyls.

The montmorillonites are 3-layer silicates consisting of an octahedral sheet sandwiched between two tetrahedral sheets and conforming to the general formula:

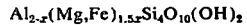

$$Al_{2-x}(Mg,Fe)_{1.5-x}Si_4O_{10}(OH)_2$$

The montmorillonites are theoretically balanced composite layers held together by van der Waal forces. Nevertheless, they nearly always possess $Mg^{+2}$ for $Al^{+3}$ substitutions resulting in up to 0.32 units of charge deficiencies which are compensated by loosely held cations on the surfaces, edges, and in the interlayer positions. These cations are easily replaceable and impart cation exchange capability to the clays.

The appended FIGURE graphically depicts two types of differential thermal analysis (DTA) curves observed with montmorillonite clays. Loss of surface or interlayer water and hydroxyl are indicated by the endothermic peaks at 150°-200° C. and 600°-700° C., respectively. One type of montmorillonite, illustrated by Curve A, demonstrated a sudden rise in slope at about 900° C., whereas Curves B and C, representing the second type of montmorillonite, manifested only a gradual change after dehydroxylization. Those montmorillonites represented by Curve A were quite refractory and vitrified to but a small extent. Hence, the rise in slope is believed to be a result of the nucleation of dense crystalline phases which cause a substantial decrease in vitrification below the melting temperature.

Montmorillonites of the second type could be sintered at a temperature around 900° C. to a porous ceramic body consisting essentially of crystalline montmorillonite-anhydrite with some glass. Further heating to higher temperatures caused the development of such phases as anorthite, cristobalite, mullite, and spinel. The proportion of glass increased with the rise in temperature but remained subordinate to the crystal phases until large scale melting and deformation began. Uncontrolled heating to temperatures in the vicinity of 1100° C. yielded a foamed glassy material. The foaming was considered to be caused by the evolution of steam and $CO_2$ resulting from dehydroxylization, burning of carbonaceous materials, and the decomposition of carbonates.

SUMMARY OF THE INVENTION

The instant invention is founded in the desire to modify the composition of the montmorillonite clay to prevent the formation of refractory crystal phases during subsequent heat treatment which can persist until melting of the body occurs. We have discovered that this objective can be accomplished through an ion exchange treatment wherein the composition of the clay can be altered without creating any inhomogeneities in the batch.

The inventive method comprises five general steps:

1. a bentonite having a cation exchange capacity of 100–200 milliequivalents (meq.)/100 grams is treated with an aqueous solution of a sodium or potassium salt to obtain a mono-cationic derivative whose composition more nearly approaches a ternary eutectic in the $Na_2O/K_2O$-$Al_2O_3$-$SiO_2$ system;

2. the ion exchanged clay is thoroughly washed with water;

3. the ion exchanged clay is then dried, normally by heating to moderate temperatures (less than about 200° C.);

4. the dried material is formed into a desired shape; and 5. the shape is vitrified by firing according to defined schedule to a top temperature of between about 950°–1200° C.

DESCRIPTION OF THE PREFERRED EMBODIMENTS

Bentolite H 4430, marketed by Whittaker, Clark, and Daniels, Inc., New York, New York, comprised DTA Curve B in the FIGURE and was stated to have the following approximate analysis in weight percent:

| | |
|---|---|
| $SiO_2$ | 68–71 |
| $Al_2O_3$ | 14–15 |
| $Na_2O$ | 4.8–5.4 |
| $K_2O$ | 0.03–0.05 |
| CaO | 0.9–1.2 |
| $Fe_2O_3$ | 0.5–0.7 |
| MgO | 3–4 |
| Loss on Ignition | 5–6 |

The cation exchange capacity of that material was approximately 100-150 meq./100 grams so that about 3–5% $Na_2O$ (or equivalents of other oxides) can be adsorbed. The particle size of the clay was such that 98% passed a No. 200 United States Standard Sieve (74 microns).

Ion exchange was carried out by immersing the clay in a 1N aqueous solution of a salt of the desired cation. More or less concentrated solutions can be utilized, the more dilute solutions requiring more total time (and, perhaps, repeated immersions) for complete ion exchange, and the more concentrated requiring somewhat less. Solutions less than about 0.1N necessitate undesirably long and/or numerous repeated immersions to achieve a high degree of exchange and, therefore, that concentration has been deemed to constitute a practical minimum. Since it is frequently difficult, if not impossible, to dissolve salts in aqueous solutions in amounts in excess of about 10N, that concentration has been considered a practical maximum.

In general, for ease of convenience, the ion exchange reaction will be undertaken at about room temperature. However, the exchange will take place at a somewhat more rapid rate where the temperature of the solution is elevated. In any event, ion exchange will occur at any temperature above the freezing point of the solution. To avoid bubbling, sputtering, etc. of the liquid, the ion exchange will be conducted below the boiling point off the solution.

Customarily, one liter of the aqueous solution will be used for each 100 grams of clay. Here again, the proportions are not critical to the operability of the invention but represent readily workable parameters. The mixture of clay and water solution is thoroughly mixed together, the solid particles allowed to settle out, and the supernatant liquid decanted off. This separation of the solids from the aqueous solution can be expedited using centrifuge techniques.

A mixing time of about one hour has been found to be a practical mean time to achieve a good degree of ion exchange but, once more, this factor of mixing time is not critical to the operability of the invention. Shorter or longer periods can be employed with satisfactory results. Frequently, to insure essentially complete ion exchange, the mixing process will be repeated with a fresh salt solution.

At the conclusion of the ion exchange reaction and the spent salt solution discarded, the clay particles will be thoroughly washed with water and dried. Commonly, the clay particles will be exposed to temperatures somewhat above 100° C., e.g., 100°–200° C., slowly remove the water left through the washing step and avoid bubbling and sputtering. Drying can, of course, simply be undertaken at room temperature or, for that matter, at any temperature above the freezing point of the solution. However, heating expedites removal of the water.

If a clay contains carbonate impurities, it will be immersed in a dilute acid solution, e.g.,5% aqueous solutions of HC1, before the ion exchange reaction. Othwewise, the final glass product will be seedy. The clay particles will then be washed in water and, optionally, dried. Thereafter, the clay will be subjected to the ion exchange reaction.

The rate of exchange is a function of temperature, particle size, ionic strength of the solution, the solid-to-liquid ratio, the nature of the replacing cation, and the energy with which the clay-solution mixture is agitated together. Such a myriad of variations renders a study of the reaction kinetics extremely complex. However, in an attempt to acquire some estimate with respect to the rate of exchange, five-gram samples of Bentolite H 4430 were immersed in 50 ml. of 1N aqueous solutions of KC1 and NaC1. Maintaining a constant rate of stirring at room temperature, the samples were analyzed after 1, 5, 10, and 30 minutes. When the increases in $K_2O$ and $Na_2O$ contents were plotted as a function of time, it was observed that near equilibrium conditons were achieved in about 10 minutes with somewhat more than one-half of the total possible alkali adsorbed by the clay.

As was noted above, the ease of exchange varies with the nature of the replacing cation, i.e., a cation of one kind does not fully replace a cation of another kind. Thus, divalent and larger cations are more firmly held than monovalent or smaller cations. Moreover, the larger and the highly charged cations compete better in the ion exchange reaction than do the smaller or less highly charged cations. Hence, with respect to a number of common cations, the order of ease in exchange can be stated as:

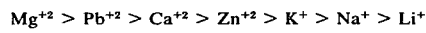

$$Mg^{+2} > Pb^{+2} > Ca^{+2} > Zn^{+2} > K^+ > Na^+ > Li^+$$

The anomalous position of $Mg^{+2}$, i.e., its behavior similar to that of a large cation, is believed due to its hydration envelope.

Although a great number of ion exchange reactions are possible with the bentonite-type clays, sound glass bodies can only be produced utilizing $Na^+$, $K^+$, $Rb^+$, and $Cs^+$ as the replacing cations. Where $Li^+$, $Ca^{+2}$, $Zn^{+2}$, and $Pb^{+2}$ were employed as the substituting ions, the final product was more refractory than the original clay. The $Li^+$ and $Pb^{+2}$ exchanged samples sintered slightly at about 1200° C., but the $Zn^+$ and $Ca^{+2}$ exchanged samples remained essentially unsintered at that temperature.

A simultaneous double ion exchange is possible to vary the properties of the final glass, e.g., $Na^+ + K^+$, or $Na^+$ or $K^+$ with smaller amounts of other cations, but a true glass will result only when the activity of the $Na^+$ and/or $K^+$ ions in solution is far greater than that of the other cation.

The montmorillonite-type clays are composed of extremely fine particles, a portion of which may have colloidal dimensions, and possess the unique capability of swelling in water to several times their original volume. This latter characteristic makes it difficult to estimate the required moisture content for optimum plasticity. Their water of plasticity (83–250% by weight) is about 5–10 times that of other clays and this high value is an undesirable feature in conventional ceramic processes. For this reason, montmorillonite clays are not utilized in ceramic manufacture except in small quantities as binders or plasticizers. Ion exchanging Bentolite H 4430 did not alter this property. Thus, forming of the ion exchanged clay cannot be successfully conducted utilizing conventional methods even with small amounts of water due to drying shrinkage and cracks. This problem can be circumvented, however, in several ways, e.g., by dry pressing with a suitable binder, wetforming using a non-polar organic liquid, extrusion with water, or calcination of the clay after ion exchange to destroy the water-swelling behavior.

For example, the uncalcined clay could be dry pressed using a binder consisting of Carbowax 20M, a polyethylene glycol marketed by Union Carbide Corp., New York, New York, dissolved in trichloroethane. Extrusion required about 40% water. Care was required in drying to avoid cracking. When the clay was calcined at about 600° C. for an hour, the material became non-water swelling with sufficient plasticity to wet form.

As has been explained above, the firing of the formed bodies to vitrification must be conducted following a particularly-defined, three-step schedule. Thus, the body formed through pressing, extruding, slip casting, etc. is customarily first heated to about 100°–200° C. to remove the water or other forming aid. Normally, a binder, as such, is not required. Then, the body is heated to a temperature between about 700°–900° C. to dehydroxylize the clay and, if present, to burn out carbonaceous matter. Finally, the body is vitrified by heating to a temperature between about 950°–1200° C. Minor amounts of spinel, mullite, and/or cristobalite can be developed during the high temperature firing. Their formation appears to be related to the immediate breakdown of the clay structure. The dehydroxylization of montmorillonite causes a rearrangement of the octahedral layer. The sheet structure denominated montmorilloniteanhydrite, seems to remain practically unaffected and persists up to a temperature of about 900° C. The disruption of the anhydrite sheet above about 900° C. is believed to form spinel from the octahedral middle layer, mullite at the octahedral-tetrahedral interface, and quartz or cristobalite from the tetrahedral layer. The interlayer alkali and adjacent silica form glass which acts as a sintering aid. These incipient crystal nuclei cannot be detected from X-ray diffraction patterns until there has been sufficient growth to cause diffraction. Therefore, the X-ray diffraction patterns appear highly diffuse below a temperature of about 1000° C. However, at about 1050° C., an examination of electron micrographs evidences a crystallinity of about 25% by volume. The crystals apparently dissolve in the glassy matrix as the temperature is further increased. Hence, at about 1100° C., electron micrographs indicate a crystal content of about 10% by volume. Unfortunately, at temperatures above 1100° C. bubbles begin to appear in the bodies which decrease strength and impact resistance. This undesirable phenomenon is believed to be due to impurities in the clay such as organic impurities and carbonates.

The Bentolite H 4430 clay subjected to a $Na^+$ ion exchange sintered to a porous, largely crystalline material at 900° C. When fired to 1000° C., considerable vitrification occurred with only a few unexpanded voids remaining. The surface thereof exhibited no glaze. Upon firing to 1100° C., vitrification was complete and the body manifested a glazed surface. Thus, the higher the firing temperature, the better the glaze and the greater the degree of vitrification. Nevertheless, as was observed above, an upper limit of firing temperature is imposed by the appearance of bubbles and/or thermal deformation of the samples.

The Bentolite H 4430 clay subjected to $K^+$ ion exchange also sintered at 900° C. but differed from the $Na^+$ ion exchanged product in exhibiting very little thermal deformation at 1100° C., in presenting a poorer surface glaze, and in greater firing shrinkage, viz., about 20% linear shrinkage as compared to about 16% in $Na^+$ ion exchanged samples.

This self-glazing capability of the glasses was initially believed to be the result of unwashed salt which, during drying operations, had sometimes been observed to accumulate on the surface. Hence, the salt was carried to the surface in solution with adsorbed water, moving by capillary action and evaporating from the surface. However, electron microprobe analyses of the glazed samples at intervals of 1 micron detected no essential change in Na 0, A1 0, or SiO contents from the surface into the interior of the sample. In view of this circumstance, the underlying mechanism causing the glaze is not indisputably understood. It is conjectured that the breakdown of the hydroxyl groups (originally present in the clay and later in the glass) lead to the production of water molecules which move to the surface of the body at elevated temperatures, lowering the viscosity of a thin surface layer and thereby permitting it to flow over the surface. It has been observed that the glazed skin forms a continuous cover sealing the interior completely. Assuming, arguendo, the correctness of that explanation, the lower degree of glaze present on the $K^+$ ion exchanged sample can be traced to a higher viscosity in the tin $K^+$ ion-containing surface melt which thereby inhibited widespread flow.

In general, the initial heat treatment of the ion exchanged sample at about 100°–200° C. will involve a time of at least about one hour. It will be appreciated, of course, that the time required will be dependent upon the bulk of the sample. Commonly, exposure times between about 1–8 hours will be employed.

The second level of heat treatment, viz., about 700°–900° C., also contemplates a time of at least one hour with, normally, exposure times of about 2–8 hours being utilized.

Finally, the firing time at temperatures between about 950°–1200° C. will customarily not exceed about two hours at 1100° C. with somewhat longer periods being satisfactory and necessary at the lower end of the range. Thus, the solution rate of the crystals in the glassy matrix increases as the firing temperature is increased. Nevertheless, deformation of the sample and the development of bubbles therein is hazarded at temperatures above about 1100° C. Therefore, at 1200° C. exposure periods of no more than about five minutes can be tolerated. As can be appreciated, the opaline character of the inventive glasses is due to the minor crystalline phase present with any bubbles which may also be present.

The rate at which the temperature is raised will commonly be kept low up to about 900° C., i.e., less than 400° C./hour and, preferably, between about 100°–300° C./hour. To expedite vitrification and inhibit thermal deformation, the body will be rapidly heated (preferably faster than 400° C./hour) into the 950°–1200° C. temperature interval. If desired, after firing at 900°–950° C., the body can simply be plunged into a chamber operating at 1000°–1200° C.

Firing of the ion exchanged articles was customarily conducted in an air atmosphere. However, environments of nitrogen, helium, argon, carbon dioxide, forming gas (92% $N_2$, 8% $H_2$), steam, and vacuum were also employed with $Na^+$ ion exchanged Bentolite H 4430. Glass quality appeared to be somewhat improved with the helium, nitrogen, and carbon dioxide atmospheres. Considerable foaming of the glass occurred during the vacuum firing, and the steam atmosphere produced extensive foaming plus the development of albite as an additional crystal phase. No apparent change was observed when the argon and forming gas environments were used.

In an effort to improve the vitrification behavior of the clay, to ameliorate the bubble formation due to decomposition of carbonaceous impurities, and/or to generally alter the physical properties of the final product, minor amounts of various additives may be included. Hence, fluxing agents such as $B_2O_3$, $P_2O_5$, $As_2O_5$, $Sb_2O_5$, and $CaF_2$ can be added to dissolve crystal phases developed. Oxidizing agents such as $NaNO_3$ can be mixed with the clay to effect complete oxidation of carbon before the body is sintered into an integral mass. The following table reports such additions. Overall, the results were not significantly better than the clay alone.

| Addition | Weight Percent Added | Result Upon Firing (1100° C.) |
|---|---|---|
| $B_2O_3$ | 2–5 | Good glass up to 2.5%. Body became porous with greater additions. |
| $As_2O_5$ | 2 | Largely glass but minor cordierite and cristobalite identified. |
| $Sb_2O_5$ | 2 | Porous body having similar microstructure as $As_2O_5$ addition. |
| $Na_2SiO_3.9H_2O$ | 5–20 | Good glass, well-glazed, but increasing thermal deformation and porosity with increasing amount. |
| $NaAlSi_3O_8$ | 2–20 | Largely glassy below 10% additions. Cordierite and cristobalite identified. |
| $CaF_2$ | 4 | Sintered to glass + anorthite ceramics with dull surface. |
| $ZrO_2$ | 2–5 | White, well-glazed ceramic up to 2%. Stones of $ZrO_2$ with higher additions. |
| $TiO_2$ | 2 | Well-glazed opaque ceramic, brownish-white in color. |
| $NaNO_3$ | 2–10 | Well-glazed surface up to 5% but became porous and inhomogeneous above 5%. |
| $SiO_2$ | 1–25 | Up to 10% additions well sintered and glazed. Above 15% body is dull looking and contains cordierite and cristobalite. |
| $Al_2O_3$ | 1–5 | Glassy appearance up to 2.5%. Corundum stones at 5%. |

The addition of up to about 1% of such conventional glass coloring agents as chromium, cobalt, copper, manganese, vanadium, etc. can produce uniformly colored glasses.

The table below records several physical properties measured on samples of $Na^+$ ion and $K^+$ ion exchanged Bentolite H 4430 clay vitrified at 1100° C. The strain point (Str. Pt.), annealing point (Ann. Pt.), coefficient of thermal expansion over the range of 25°–800° C. ($\times 10^{-7}$/°C.), modulus of rupture (psi), Knoop hardness ($KHN_{100}$), and density (g/cc²) were determined in accordance with methods conventional in the glass art. Chemical durability was measured utilizing a 5% aqueous solution of HCl for 24 hours at 95° C., a 5% aqueous solution of NaOH for 6 hours at 95° C., and a 0.02N aqueous solution of $Na_2CO_3$ for 6 hours at 95° C. The results reflect weight loss in mg/cm².

|  | $Na^+$ Exchanged | $K^+$ Exchanged |
|---|---|---|
| Str. Pt. | 650° C. | 740° C. |
| Ann. Pt. | 712° C. | 820° C. |
| Exp. Coef. | 38 | 50 |
| MOR (abraded) | 9000 | 9500 |
| Hardness | 477 | 440 |
| Density | 2.24 | 2.37 |
| 5% HCl | 0.03 | 0.06 |
| 5% NaOH | 0.51 | 1.30 |
| 0.02N $Na_2CO_3$ | 0.02 | 0.01 |

Gelwhite GP 2492 and Bentonite 660, two bentonite-type clays marketed by Whittaker, Clark, and Daniels, comprise Curves C and A, respectively, of the FIGURE and were stated to have the following approximate analyses in weight percent:

|  | Gelwhite | Bentonite 660 |
|---|---|---|
| $SiO_2$ | 57–59 | 64 |
| $Al_2O_3$ | 19–21 | 20 |
| $Na_2O$ | 3–4 | 1.8 |
| $K_2O$ | 0.04 | — |
| CaO | 2–2.5 | 0.3 |
| $Fe_2O_3$ | 0.84–0.94 | 5.5 |
| $TiO_2$ | 0.15–0.25 | — |
| MgO | 2.7–3.7 | 2.0 |
| Loss on Ignition | 9.5–10 | 4–10 |

Both clays were first treated in a 5% aqueous solution of HCl at 80° C. and then immersed into a solution of KCl in like manner to the Bentolite H 4430 described above. Each was thereafter vitrified utilizing a firing schedule of 200° C. for 4 hours, 700° C. for 4 hours, and 1100° C. for 2 hours. The table below reports the results.

|  | Gelwhite GP 2492 | Bentonite 660 |
|---|---|---|
| Acid Treatment Only | Slightly sintered white ceramic, completely crystalline. | Did not sinter. Dark brown fragmentary body. |
| $K^+$ Exchanged | Off-white, well-sintered glassy body with a little gloss. | Reddish brown ceramic with glassy skin. |

As is apparent, Gelwhite GP 2492 can be vitrified into a homogeneous, useful opal glass whereas the Bentonite 660 cannot. A comparison of the analyses of Bentolite H 4430 and Gelwhite GP 2492 manifests considerable differences in composition. Yet, both have one vital feature in common. Both exhibit DTA curves free from a sudden rise in slope at about 900° C. In contrast, Bentonite 660 shows a DTA curve having a sharp rise in slope at about 900° C. As was explained above, this rise in slope is believed to be a result of the nucleation of dense crystalline phase which leads to a substantial decrease in vitrification below the melting temperature. Hence, that feature is deemed to be critical in determining bentonite clays operable in the invention.

The reddish-brown coloration in the Bentonite 660 product is believed to be due to the presence of substantial quantities of iron oxide therein (reported as $Fe_2O_3$). Therefore, where a product having a white appearance is desired, the $Fe_2O_3$ content will be maintained below about 1%.

The table below records approximate analyses in weight percent, as furnished by the suppliers, of other commercially-marketed beontinte clays which exhibit a DTA curve free from a sharp rise in slope at about 900° C. and have a cation exchange capacity of about 100–200 milliequivalents/100 grams, thereby rendering them operable in the present invention.

| Commercial Name | Syltex VA | NC 30 | Soft Clark Bentonite | 4435 Bentolite L | 2429 Gelwhite L |
|---|---|---|---|---|---|
| Supplier | Georgia Kaolin Co. | Georgia Kaolin Co. | Southern Clay Products, Inc. | Whittaker, Clark and Daniels, Inc. | Whittaker, Clark and Daniels, Inc. |
| Chemical Analysis | | | | | |
| $SiO_2$ | 72.0 | 63.3 | 78.5 | 70–72 | 58–62 |
| $Al_2O_3$ | 14.5 | 13.8 | 15.8 | 16–17 | 19.5–23 |
| MgO | 0.2 | 2.5 | 2.6 | 3.3–3.9 | 3.4–3.8 |
| $Fe_2O_3$ | 0.7 | 0.7 | 1.1 | 0.2–0.4 | 0.8–1 |
| CaO | 0.7 | 1.3 | 1.2 | 1–2 | 1.9–2.5 |
| $Na_2O$ | 5.0 | 0.8 | — | 0.2–0. | 1–1.6 |
| $K_2O$ | — | 0.4 | — | — | — |
| Moisture | — | } 17.3 | } 17.6 | 5–6.3 | 8–10 |
| Loss on Ignition | 6.0 | | | 6.5–7.5 | 7–8 |

As is apparent from the above table, the compositions of operable bentonite clays can vary over relatively broad ranges. However, it is the demonstration of a DTA curve free from a sharp rise in slope at about 900° C. and the having of a cation exchange capacity of about 100–200 milliequivalents/100 grams which is vital to the utility of a particular clay. In light of the above-described exemplary compositions, operable bentonite clays will, in general, have compositions consisting essentially, in weight percent on the oxide basis, of about 57–78.5% $SiO_2$, 13.8–23% $Al_2O_3$, 0–4% MgO, 0–5% $Fe_2O_3$, 0–2.5% CaO, 0–5.4% $Na_2O$, and 0–0.5% $K_2O$.

I claim:

1. A method for making an opal glass comprising the steps of:
   A. a bentonite clay exhibiting a DTA curve free from a sharp rise in slope at about 900° C., having a cation exchange capacity of about 100–200 milliequivalents/100 grams, and consisting essentially, in weight percent on the oxide basis, of about 57–78.5% $SiO_2$, 13.8–23% $Al_2O_3$, 0–4% MgO, 0–5% $Fe_2O_3$, 0–2.5% CaO, 0–5.4% $Na_2O$, and 0–0.5% $K_2O$, is treated with an aqueous solution of a sodium and/or potassium salt to exchange sodium and/or potassium ions with other cations present in said clay to obtain a mono-cationic derivative having a composition within the $Na_2O/K_2O$-$Al_2O_3$-$SiO_2$ system;
   B. the ion exchanged clay is washed with water;
   C. the washed clay is dried;
   D. the dried clay is shaped into a desired form; and
   E. the clay shape is fired to vitrification in accordance with the schedule:
      a. the clay shape is dried;
      b. the clay shape is dehydroxylized and carbonaceous material is burned out by heating to about 700°–900° C.; and then
      c. the clay shape is vitrified by heating to about 950°–1200° C.

2. A method according to claim 1 wherein said ion exchange is conducted in 0.1N–10N aqueous solutions of sodium and/or potassium salts.

3. A method according to claim 2 wherein said sodium and/or potassium salts are NaCl and/or KCl.

4. A method according to claim 1 wherein said ion exchange is conducted at temperatures between the freezing point and boiling point of the aqueous solution.

5. A method according to claim 4 wherein said ion exchange is conducted at room temperature.

6. A method according to claim 1 wherein said clay contains carbonate impurities such that it is treated in a dilute acid solution, washed with water, and, optionally, dried prior to being subjected to the ion exchange reaction.

7. A method according to claim 1 wherein said washed clay is dried at a temperature between about 100°–200° C.

8. A method according to claim 1 wherein said clay shape is dried by heating at a temperature between about 100°–200° C.

9. A method according to claim 1 wherein said clay shape is dehydroxylized and carbonaceous material is burned out by heating for about 2–8 hours.

* * * * *

UNITED STATES PATENT AND TRADEMARK OFFICE
CERTIFICATE OF CORRECTION

PATENT NO. : 4,017,289
DATED : April 12, 1977
INVENTOR(S) : Syed N. Hoda

It is certified that error appears in the above-identified patent and that said Letters Patent are hereby corrected as shown below:

Column 1, line 18, "12°C." should be -- 1200°C. --.

Column 5, line 7, "carbon-aceous" should be -- carbonaceous --.

Column 5, line 15, "montmorilloniteanhydrite" should be -- montmorillonite-anhydrite --.

Columns 9 and 10, Table Heading "4435 Bentolite L", "0.2-0." should be -- 0.2-0.3 --.

Column 5, line 65, "Na O, Al O, or SiO" should be -- $Na_2O, Al_2O_3$, or $SiO_2$ --.

Signed and Sealed this twenty-third Day of August 1977

[SEAL]

Attest:

RUTH C. MASON
Attesting Officer

C. MARSHALL DANN
Commissioner of Patents and Trademarks